(12) United States Patent
Nachshon

(10) Patent No.: US 8,272,157 B2
(45) Date of Patent: Sep. 25, 2012

(54) FIBER LASER DEVICE FOR NEUTRALIZING UNEXPLODED ORDINANCE

(75) Inventor: Yehuda Nachshon, Timrat (IL)

(73) Assignee: Rafael Advanced Defense Systems, Haifa (IL)

( * ) Notice: Subject to any disclaimer, the term of this patent is extended or adjusted under 35 U.S.C. 154(b) by 405 days.

(21) Appl. No.: 11/909,987

(22) PCT Filed: Mar. 26, 2006

(86) PCT No.: PCT/IL2006/000377
§ 371 (c)(1),
(2), (4) Date: Jun. 23, 2008

(87) PCT Pub. No.: WO2006/103655
PCT Pub. Date: Oct. 5, 2006

(65) Prior Publication Data
US 2009/0052475 A1 Feb. 26, 2009

(30) Foreign Application Priority Data
Mar. 30, 2005 (IL) .......................................... 167740

(51) Int. Cl.
*F41G 1/00* (2006.01)
(52) U.S. Cl. ............ 42/114; 42/125; 89/1.13; 89/41.06; 89/41.17; 102/402; 385/31; 385/100
(58) Field of Classification Search ............ 42/114–117, 42/124–128; 89/1.13, 41.01–206; 102/402; 385/31, 100
See application file for complete search history.

(56) References Cited

U.S. PATENT DOCUMENTS

| | | | | |
|---|---|---|---|---|
| 3,757,632 A * | 9/1973 | Bellinger | .......................... | 89/1.1 |
| 3,845,276 A * | 10/1974 | Kendy et al. | .................. | 235/404 |
| 4,011,789 A * | 3/1977 | Bresee et al. | ................. | 89/41.21 |
| 4,671,180 A * | 6/1987 | Wallow et al. | ................ | 102/517 |
| 4,773,298 A * | 9/1988 | Tischer et al. | ................ | 89/1.13 |
| 5,171,933 A * | 12/1992 | Eldering | ...................... | 89/41.06 |
| 5,493,450 A * | 2/1996 | Ekstrand | ...................... | 359/799 |
| 5,824,942 A * | 10/1998 | Mladjan et al. | .............. | 89/41.17 |
| 5,831,724 A * | 11/1998 | Cordes | ...................... | 356/141.1 |
| 5,992,292 A * | 11/1999 | Ennenga | ...................... | 89/41.22 |
| 6,417,797 B1 * | 7/2002 | Cousins et al. | ............... | 342/179 |
| 6,704,479 B2 * | 3/2004 | Koplow | .......................... | 385/31 |
| 6,825,792 B1 * | 11/2004 | Letovsky | ...................... | 342/14 |
| 7,626,152 B2 * | 12/2009 | King et al. | ................. | 250/201.9 |
| 7,688,247 B2 * | 3/2010 | Anschel et al. | ................. | 342/14 |
| 7,752,953 B2 * | 7/2010 | Sokol et al. | .................... | 89/1.13 |
| 7,946,207 B1 * | 5/2011 | Porter et al. | ..................... | 89/1.11 |
| 2003/0021529 A1 * | 1/2003 | Koplow | ....................... | 385/31 |
| 2004/0200341 A1 * | 10/2004 | Walters et al. | ................. | 89/1.13 |
| 2010/0100085 A1 * | 4/2010 | Lewinsky et al. | ............... | 606/16 |
| 2010/0103508 A1 * | 4/2010 | Pochapsky | .................... | 359/353 |

FOREIGN PATENT DOCUMENTS

EP           1629299        3/2006
* cited by examiner

Primary Examiner — Michael Carone
Assistant Examiner — Samir Abdosh
(74) Attorney, Agent, or Firm — Mark M Friedman

(57) ABSTRACT

A device for directing a beam of radiation at a target. The device includes a fiber laser for producing the beam of radiation, an aiming mechanism, for aiming the beam of radiation at the target, that moves independently of the fiber laser, and an optical fiber for conveying the beam of radiation to the aiming mechanism.

18 Claims, 2 Drawing Sheets

FIBER LASER DEVICE FOR NEUTRALIZING UNEXPLODED ORDINANCE

FIELD AND BACKGROUND OF THE INVENTION

The present invention relates to devices for directing a beam of coherent radiation at a target and, more particularly, to a fiber-laser-based device for neutralizing unexploded ordinance and for similar applications.

Laser-based systems for neutralizing unexploded ordinance are known. One such system is the ZEUS™ system produced by the International Systems Operation division of Sparta Inc., located in Huntsville, Ala., USA. FIG. 1 is a partial high-level schematic diagram of such a system 10. A continuous wave laser 12, a telescope 16 and a video camera 18 are mounted on a gimbaled platform 14. These four components are controlled by an operator using a fire control console 20. The operator uses video camera 18 to locate a target to be neutralized. More specifically, the operator turns and tilts platform 14 until the target is centered in a video screen in fire control console 20 that displays the images acquired by video camera 18. Video camera 18 is boresighted to laser 12 and telescope 16 so that when the target is centered in the video screen, laser 12 and telescope 16 are aimed at the target and a beam 22 of coherent radiation that is emitted by laser 12 when laser 12 is activated and that is focused by telescope 16 strikes the target. The operator focuses telescope 16 on the target and activates laser 12 to generate coherent beam 22. The operator continues to monitor the target using video camera 18 to verify that coherent beam 22 has indeed neutralized the target.

It would be advantageous to position laser 12 remotely from platform 14. The advantages of such a system include that platform 14 could be made lighter and/or mechanically more stable if platform 14 does not need to bear the weight of laser 12, and that a kinetic weapon such as a light or heavy machine gun could be mounted on platform 14 to supplement coherent beam 22 without the vibration of the kinetic weapon interfering with the operation of laser 12. An optical fiber would be used to convey coherent beam 22 from laser 12 to telescope 16.

Heretofore, two problems have prevented the implementation of such a system. Both problems are related to the high power of coherent beam 22 that is needed to neutralize the intended targets.

The first problem relates to the coupling of a conventional laser 12 (for example the Nd:YAG laser used in the Zeus system) to the optical fiber. To produce an adequately bright coherent beam 22 with a small spot size on the target, the combination of laser 12 and the optical fiber should have a low "beam parameter product" (BPP). To have a sufficiently low BPP, the optical fiber should have a narrow-diameter core. It is difficult to optically couple the high-power coherent beam 22 generated by laser 12 to a sufficiently narrow core without damaging the optical fiber.

The second problem is that the high power of coherent beam 22 gives rise to nonlinear effects such as Stimulated Raman Scattering and Stimulated Brillouin Scattering in the optical fiber. These nonlinear effects reduce the power of the coherent beam that finally emerges from the optical fiber and so limit the length of the optical fiber that can be used to couple laser 12 to telescope 16.

SUMMARY OF THE INVENTION

A fiber laser is a laser whose lasing medium is an optical fiber that is doped with a suitable dopant such as ytterbium, neodymium, erbium or thulium. Very recently, such lasers have become available with powers in excess of 300 watts, making these lasers suitable for use in systems for neutralizing unexploded ordinance. Such lasers are available, for example, from IPG Photonics Corporation of Oxford. Mass., USA, from SPI Optics, Southampton UK and from Xtreme Technologies GmbH, Jena, Germany. These lasers would not suffer from the two problems described above in connection with the lasers of prior art systems. First, the optical fiber that couples the laser to telescope 16 would be a direct extension of the lasing medium, so that there would be no obstacle to coupling the laser to the optical fiber while achieving a suitably low BPP. Second, the nonlinear effects in the optical fiber would be greatly reduced. This is because the magnitude of the optical effects is proportional to the inverse square of the bandwidth of the coherent beam, and the coherent beams produced by fiber lasers have significantly wider bandwidths than the coherent beams produced by the lasers used heretofore in systems for neutralizing unexploded ordinance.

Therefore, according to the present invention there is provided a device for directing a beam of radiation at a target, including: (a) a fiber laser for producing the beam of radiation; (b) an aiming mechanism, for aiming the beam of radiation at the target, that moves independently of the fiber laser; and (c) an optical fiber for conveying the beam of radiation to the aiming mechanism.

Furthermore, according to the present invention there is provided a device including: (a) a laser for producing a beam of radiation having a power of at least about 300 watts; and (b) an optical fiber that is optically coupled to the laser to receive the beam of radiation; wherein a product of a power of the beam of radiation and a length of the optical fiber is at least about 4000 watt-meters.

Furthermore, according to the present invention there is provided a method of irradiating a target, including the steps of: (a) producing a beam of radiation, using a fiber laser; (b) optically coupling a proximal end of an optical fiber to the fiber laser to receive the beam of radiation; and (c) aiming a distal end of the optical fiber at the target.

Furthermore, according to the present invention there is provided a method of irradiating a target that includes a casing, including the steps of: (a) piercing the casing using a kinetic weapon, thereby creating an aperture in the casing; and (b) directing a beam of radiation into the target via the aperture.

The basic embodiment of a first device of the present invention includes a fiber laser for producing a beam of radiation, an aiming mechanism for aiming the beam of radiation at a target and an optical fiber for conveying the beam of radiation to the aiming mechanism. Unlike prior art gimbaled platform 14 of system 10, that moves along with laser 12 because laser 12 is mounted on platform 14, the aiming mechanism of the present invention moves independently of the fiber laser, which means that, in normal operation, the aiming mechanism can be moved without moving the fiber laser and that the fiber laser can be moved without moving the aiming mechanism.

Preferably, the beam of radiation produced by the fiber laser has a power of at least about 300 watts. More preferably, the beam of radiation produced by the fiber laser has a power of at least about 3000 watts. Most preferably, the beam of radiation produced by the fiber laser has a power of at least about 30,000 watts.

Preferably, the lasing medium of the fiber laser includes an optical fiber doped with ytterbium, neodymium, erbium or thulium.

Preferably, the optical fiber extends substantially from the fiber laser all the way to the aiming mechanism.

Preferably, the optical fiber is passive, meaning that it merely transmits the beam of radiation and does not amplify the beam of radiation in the manner of, e.g., an erbium-doped fiber amplifier.

Preferably, the optical fiber is at least about 30 centimeters long. More preferably, the optical fiber is at least about one meter long. Most preferably, the optical fiber is at least about three meters long.

Preferably, the device also includes an optical system for focusing the beam of radiation on the target. Most preferably, this optical system includes a telescope.

Preferably, the device also includes a kinetic weapon. The aiming mechanism aims both the beam of radiation and the kinetic weapon at the target.

Preferably, the device also includes a mobile platform on which the aiming mechanism is mounted. The fiber laser also may be mounted on the same platform as the aiming mechanism, or alternatively may be "detached" from that platform, i.e., mounted elsewhere than the same platform as the aiming mechanism.

The basic embodiment of a second device of the present invention includes a laser (not necessarily a fiber laser) for producing a beam of radiation and an optical fiber that is optically coupled to the laser to produce a beam of radiation. What distinguishes this device from prior art devices that are used e.g. for optical communication is that the power of the beam of radiation is at least about 300 watts and that the product of the power of the beam of radiation, the length of the optical fiber and the brightness ("$M^2$") of the optical fiber is at least about 40,000 watt-meters. Preferably, product of the power of the beam of radiation, the length of the optical fiber and the brightness of the optical fiber is at least about 10 kilowatt-meters. Most preferably, product of the power of the beam of radiation, the length of the optical fiber and the brightness of the optical fiber is at least about 1000 kilowatt-meters.

The scope of the present invention also includes two methods of irradiating a target.

According to the first method, a fiber laser is used to produce a beam of radiation. One ("proximal") end of an optical fiber is optically coupled to the fiber laser to receive the beam of radiation. The other ("distal") end of the optical fiber is aimed at the target and the radiation beam emerging from the distal end of the fiber is focused on the target, preferably using a telescope. Preferably, the fiber laser produces a beam of radiation that has a power of at least about 300 watts.

According to the second method, that is directed at irradiating a target that includes a casing, first a kinetic weapon is used to make an aperture in the casing. Then a beam of radiation is directed into the target via that aperture. Preferably, the beam of radiation is produced using a laser such as a fiber laser.

The latest model of the ZEUS™ system is said to use a 2 Kw fiber laser as laser 12. However, this laser, like its predecessor, is mounted on platform 14, so that even the latest model of the ZEUS™ system does not enjoy the advantages of the present invention.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a device for directing a beam of radiation at a target. Specifically, the present invention can be used for applications such as neutralizing unexploded ordinance.

The principles and operation of target irradiation according to the present invention may be better understood with reference to the drawings and the accompanying description.

Figure 1:
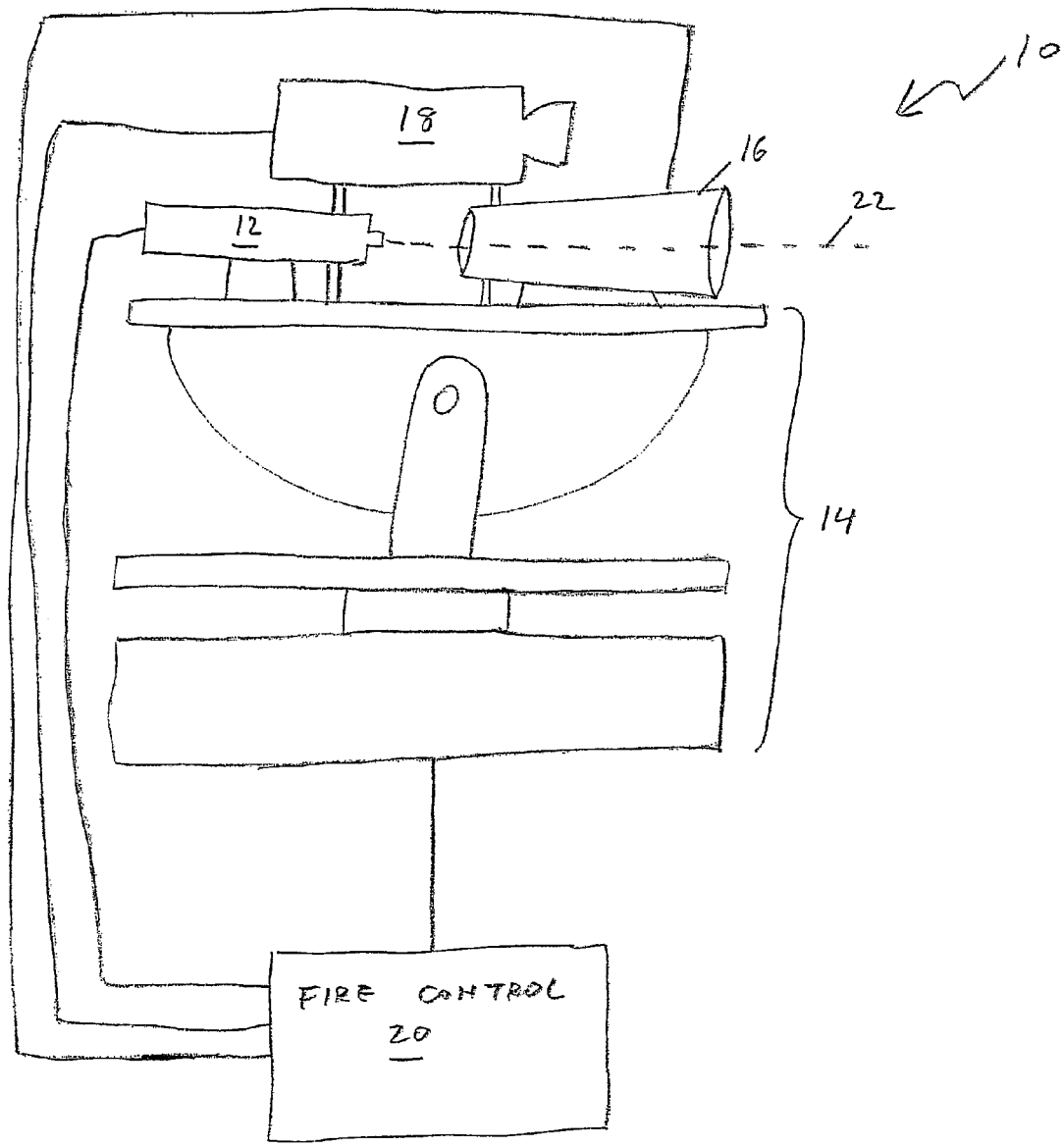
FIG. 1 is a high-level schematic diagram of a prior art system for neutralizing unexploded ordinance.
Figure 2:
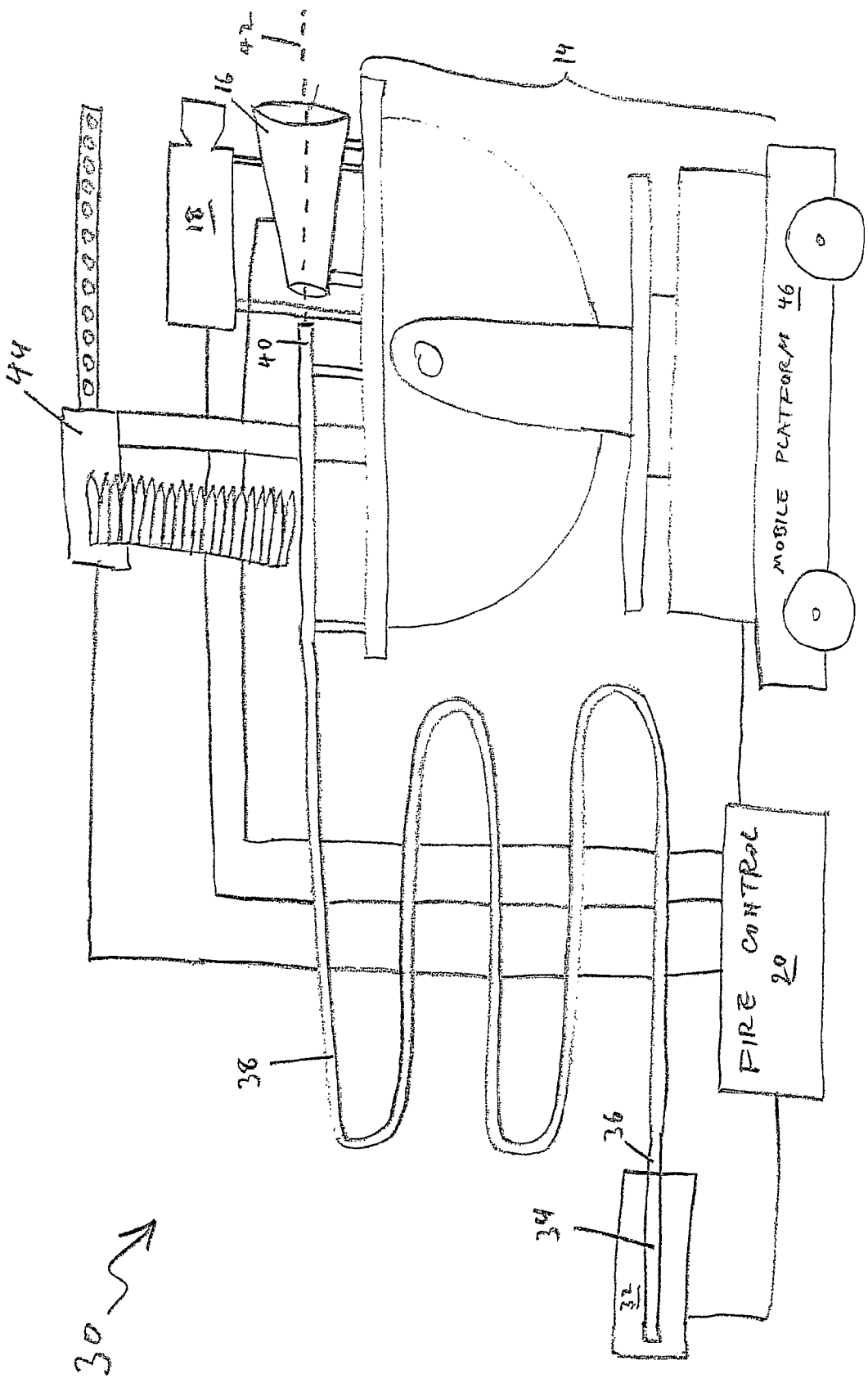
FIG. 2 is a high-level schematic diagram of a system of the present invention for neutralizing unexploded ordinance.

Returning now to the drawings, FIG. 2 is a high-level schematic diagram of a system 30 of the present invention. System 30 shares many of its components with prior art system 10; these components are indicated by the same reference numerals in FIG. 2 as in FIG. 1. The main difference between system 10 and system 30 is that instead of laser 12 system 30 includes a fiber laser 32 that is not mounted on platform 14. Instead, the doped optical fiber 34 that forms the lasing medium of fiber laser 32 is optically coupled to the proximal end 36 of a passive, flexible optical fiber 38 whose distal end 40 is mounted on platform 14 and is optically coupled to telescope 16. In different configurations of system 30, optical fiber 38 is 30 centimeters long, one meter long, three meters long, or even, in a particular configuration discussed below, 200 meters long.

Normally, optical fiber 38 is fabricated separately from fiber laser 32 and is optically coupled to doped optical fiber 34 by butting proximal end 36 against one end of doped optical fiber 34. Alternatively, optical fiber 38 is integral with doped optical fiber 34: one way to make fiber laser 32 and optical fiber 38 is to dope only one end of an optical fiber with a dopant such as ytterbium, neodymium, erbium or thulium. The doped end of the optical fiber is used as the lasing medium of fiber laser 32, and the rest of the optical fiber becomes passive optical fiber 38.

System 30 is used substantially in the same way as system 10. Video camera 18 is boresighted to distal end 40 of optical fiber 38 and to telescope 16. The operator of system 30 uses video camera 18 to locate the target to be neutralized, by turning and tilting platform 14 until the target is centered in the video screen of fire control console 20. Distal end 40 of optical fiber 38 and telescope 16 thus are aimed at the target. The operator of system 30 then focuses telescope 16 on the target and activates fiber laser 32 to create a beam 42 of coherent radiation. This beam 42 is conveyed by optical fiber 38 to telescope 16 and is focused by telescope 16 onto the target.

As noted above, fiber lasers 32 with output powers of 300 watts, 3000 watts or even 30,000 watts now are available. The direct coupling of optical fiber 38 to fiber laser 32 and the relatively large linewidth of the beam 42 of coherent radiation that is emitted by laser 32 allow optical fiber 38 to be much longer than would be possible using laser 12 of prior art system 10. This is because the non-linear gain of optical fiber 38 is approximately proportional to the inverse square of the linewidth of beam 42. The higher the gain, the more severe are nonlinear effects such as backward Stimulated Raman Scattering and backward Stimulated Brillouin Scattering. Conventional continuous wave lasers, e.g. Nd:YAG lasers, have linewidths of less than 5 Å. Fiber lasers have linewidths as large as about 30 Å. Therefore, an optical fiber coupled to a high power fiber laser can be 36 times as long as an optical fiber coupled to a conventional high power continuous wave laser with the same brightness.

For a laser having output powers of 300 watts or more, the appropriate figure of merit for determining the maximum length of the optical fiber that can be coupled to the laser with high brightness at the distal end of the optical fiber is the product of the laser power, the length of the fiber and the equivalent brightness ("$M^2$") of the fiber. According to the prior art, this figure of merit was restricted to under 40,000 watt-meters. According to the present invention, this figure of merit may be as great as 1440 kilowatt-meters. So, for example, with a prior art laser 12 that emits a beam 22 of coherent radiation having a power of 1000 watts, optical fiber 38 with a brightness of 10 had to be less than four meters long. By contrast, with a fiber laser 32 that emits a beam 42 of coherent radiation having a power of 1000 watts, optical fiber 38 with a brightness of 10 can be 144 meters long.

Platform 14 of system 30 also has mounted thereon a kinetic weapon in the form of a machine gun 44 to which video camera 18 also is boresighted, so that when distal end 40 of optical fiber 32 is aimed at the target, machine gun 44 also is aimed at the target. Like fiber laser 32, machine gun 44 is operated via fire control console 20. The operator of system 30 has the option of supplementing coherent radiation beam 42 with ammunition rounds fired from machine gun 44. Because fiber laser 32 is not mounted on platform 16 of system 30, the firing of machine gun 44 does not interfere with the operation of fiber laser 32.

One application of machine gun 44 is to the neutralization of unexploded artillery shells. The casing of such a shell protects the explosives contained therein, so that it takes an unreasonably long time to neutralize such a shell using fiber laser 32 alone. According to the present invention, machine gun 44 is fired at the shell to puncture the shell's casing. Radiation beam 42 then is aimed and focused at the hole thereby created in the casing.

The term "casing" as used in the appended claims should be interpreted as including any kind of shield that prevents radiation beam 42 from reaching an explosive charge. For example, an explosive charge may be camouflaged behind a concrete barrier. Such a concrete barrier, being thermally insulating, renders fiber laser 32 by itself totally useless for neutralizing the concealed explosive charge. According to the present invention, machine gun 44 is used to disrupt the concrete barrier and allow access by beam 42 to the explosive charge that is to be neutralized.

FIG. 2 shows gimbaled platform 14 mounted on a mobile platform 46. Actually, in many embodiments of the present invention, all of system 30 is mounted on a mobile platform. Suitable mobile platforms include jeeps, HMMWVs, armored personnel carriers, tanks and helicopters. Unlike prior art system 10 that requires the exposure of laser 12 to enemy fire along with the other components that are mounted on platform 14, system 30 permits the placement of fiber laser 32 in a protected location within the mobile platform. In the alternative embodiment illustrated in FIG. 2, in which only gimbaled platform 14 is mounted on mobile platform 46, mobile platform 46 typically is a robotic platform. It is in this embodiment that optical fiber 38 preferably is 200 meters long or longer, to allow remote operation of the components that are mounted on gimbaled platform 14 without placing the operator of system 30 at risk.

System 30 has applications beyond just neutralizing unexploded ordinance. In an urban combat setting, system 30 can be used to cut through metal bars and to destroy door locks to facilitate entry to buildings and vehicles. System 30 can be used by law enforcement personnel and rescue personnel for similar purposes in a civilian context. System 30 also can be used by law enforcement personnel to disable a moving vehicle by puncturing the tires of the vehicle. Among other civilian uses of system 30 is the cleaning of soot, grime and other deposits from building facades.

While the invention has been described with respect to a limited number of embodiments, it will be appreciated that many variations, modifications and other applications of the invention may be made.

What is claimed is:

1. A device for directing a beam of radiation at a target, comprising:
   (a) a fiber laser for producing the beam of radiation;
   (b) an aiming mechanism, for aiming the beam of radiation at the target, that moves independently of said fiber laser;
   (c) an optical fiber for conveying the beam of radiation to said aiming mechanism; and
   (d) a kinetic weapon that lacks an explosive warhead and that disrupts at least a portion of the target only by force of kinetic impact;
wherein said aiming mechanism comprises a gimbaled platform supporting both said kinetic weapon and an end of said optical fiber, and wherein said aiming mechanism is operative to align said gimbaled platform, thereby aiming both the beam of radiation and said kinetic weapon at the target.

2. The device of claim 1, wherein said fiber laser produces the beam of radiation with a power of at least 300 watts.

3. The device of claim 2, wherein said fiber laser produces the beam of radiation with a power of at least 3000 watts.

4. The device of claim 3, wherein said fiber laser produces the beam of radiation with a power of at least 30,000 watts.

5. The device of claim 1, wherein said fiber laser includes a lasing medium that includes an optical fiber doped with a dopant selected from the group consisting of ytterbium, neodymium, erbium and thulium.

6. The device of claim 1, wherein said optical fiber extends substantially from said fiber laser to said aiming mechanism.

7. The device of claim 1, wherein said optical fiber is at least 30 centimeters long.

8. The device of claim 7, wherein said optical fiber is at least one meter long.

9. The device of claim 8, wherein said optical fiber is at least three meters long.

10. The device of claim 1, further comprising:
    (e) an optical system for focusing the beam of radiation on the target.

11. The device of claim 10, wherein said optical system includes a telescope.

12. The device of claim 1, further comprising:
    (e) a mobile platform on which said aiming mechanism is mounted.

13. The device of claim 12, wherein said fiber laser also is mounted on said mobile platform.

14. The device of claim 12, wherein said fiber laser is detached from said mobile platform.

15. The device of claim 1, wherein the beam of radiation has a power of at least 300 watts; and wherein a product of said power of said beam of radiation, a length of said optical fiber and a brightness of said optical fiber is at least 40,000 watt-meters.

16. The device of claim 1, wherein a proximal end of said optical fiber is optically coupled to said fiber laser to receive said beam of radiation.

17. The device of claim 1, wherein the kinetic weapon includes a gun.

18. The device of claim 1, further comprising a video camera mounted on said gimbaled platform and aligned with both said kinetic weapon and with said end of said optical fiber.

* * * * *